United States Patent
Jiang et al.

(10) Patent No.: US 10,887,361 B2
(45) Date of Patent: Jan. 5, 2021

(54) PORT MIRRORING IN OVERLAY NETWORKS

(71) Applicant: Nicira, Inc., Palo Alto, CA (US)

(72) Inventors: Jingchun Jason Jiang, Beijing (CN); Donghai Han, Beijing (CN); Hua Wang, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 5 days.

(21) Appl. No.: 15/421,365

(22) Filed: Jan. 31, 2017

(65) Prior Publication Data

US 2018/0124139 A1 May 3, 2018

Related U.S. Application Data

(60) Provisional application No. 62/416,104, filed on Nov. 1, 2016.

(51) Int. Cl.
*H04L 12/26* (2006.01)
*H04L 29/06* (2006.01)
*H04L 12/761* (2013.01)
*H04L 29/12* (2006.01)

(52) U.S. Cl.
CPC ........ *H04L 65/4076* (2013.01); *H04L 43/028* (2013.01); *H04L 43/08* (2013.01); *H04L 45/16* (2013.01); *H04L 61/2007* (2013.01); *H04L 61/2069* (2013.01)

(58) Field of Classification Search
CPC .. H04L 65/4076; H04L 45/16; H04L 61/2069
See application file for complete search history.

(56) References Cited

U.S. PATENT DOCUMENTS

| | | | |
|---|---|---|---|
| 9,246,703 B2 * | 1/2016 | Yu | H04L 12/4625 |
| 2016/0087859 A1 | 3/2016 | Kuan et al. | |
| 2018/0006930 A1 * | 1/2018 | Du | H04L 45/16 |

\* cited by examiner

*Primary Examiner* — Bo Hui A Zhu
(74) *Attorney, Agent, or Firm* — Adeli LLP

(57) ABSTRACT

A method of mirroring packets in a network. The method assigns an Internet protocol (IP) multicast address to an overlay network for transmitting mirrored packets. The method connects a set of monitoring data compute nodes (DCNs) to the overlay network for receiving the mirrored packets. The method adds the monitoring DCNs to an IP multicast group for the overlay network. The method associates a port of a mirrored DCN to the overlay network for packet mirroring. The method duplicates each packet received or transmitted at the port as a mirrored packet. The method encapsulates each mirrored packet with the IP multicast address of the overlay network. The method transmits each encapsulated packet on the overlay network.

18 Claims, 10 Drawing Sheets

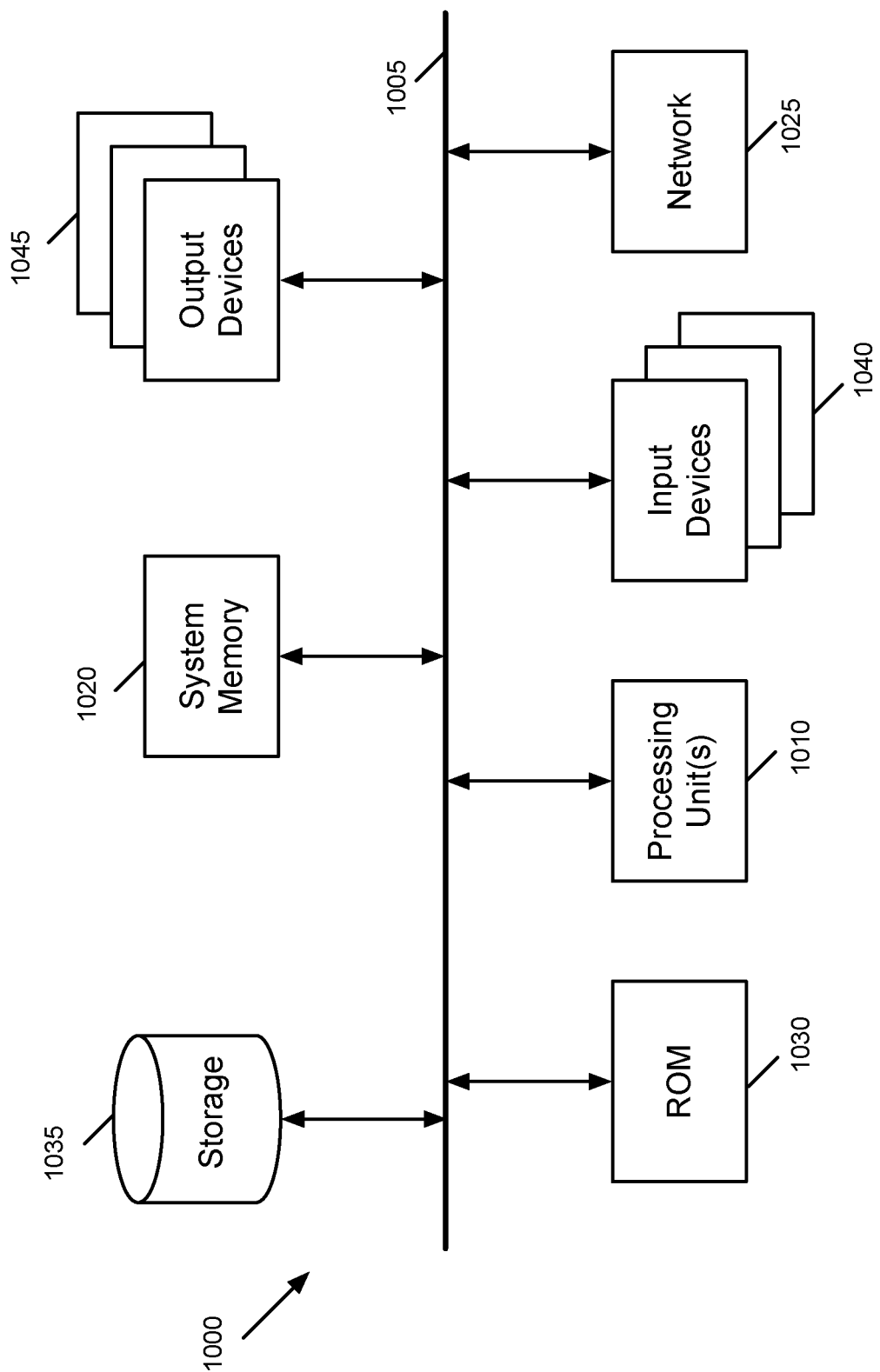

PORT MIRRORING IN OVERLAY NETWORKS

CLAIM OF BENEFIT TO PRIOR APPLICATIONS

This application claims the benefit of U.S. Provisional Patent Application 62/416,104, filed Nov. 1, 2016. U.S. Provisional Patent Application 62/416,104 is incorporated herein by reference.

BACKGROUND

In classic L2 networking, port mirroring is a useful technology that allows sending a copy of network packets that arrive at or transmitted from a network switch port (mirrored port or monitored port) to another port (capture port or monitor port). Port mirroring is used in applications such as for monitoring network traffic and intrusion detection. Current implementations of port mirroring such as remote switched port analyzer (RSPAN) centralize the monitor devices across multiple physical switches by using a virtual local area network (VLAN). The mirrored packets are distributed to different monitor devices that are connected to different physical switches.

The same implementation can be used in a single datacenter virtualization environment by mirroring packets to a dedicated VLAN identifier. However, in a cloud environment different devices are possibly located in a logical L2 domain that may span multiple datacenters. In a multiple datacenter environment, traditional RSPAN does not work.

BRIEF SUMMARY

A method of packet mirroring is provided that allows mirrored packets to be sent to monitor devices across multiple datacenter or across multiple networks. An overlay network that is dedicated to port mirroring is defined. An identifier is assigned to the overlay network. The ports to be mirrored are connected to the dedicated overlay network. In addition, one or more virtual machines (VMs) are configured as monitor (or capture) devices to receive the mirrored packets. A port of each monitor VM is also connected to the dedicated overlay network.

Some embodiments send the mirrored packets to the monitor devices using a multicast approach. The mirrored packets in these embodiments are treated as broadcast packets or unknown unicast packets. The overlay network is assigned a multicast IP address. The monitor VMs send out requests to join the IP multicast group. The monitor VMs also turn on promiscuous mode on the ports that are connected to the overlay network in order to receive mirrored packets with the destination media access control (MAC) address that does not match the MAC address of the port. The monitored ports are associated with the overlay network identifier to enable port mirroring.

When packets arrive to or transmitted from a mirrored port, the packets are duplicated (or cloned) and the overlay network identifier of the dedicated overlay network is added to the packet metadata. The packets are added to a list of mirrored packets (e.g., the packets identifiers are added to a mirrored packet list).

On a separate thread, the metadata of the packets in the mirrored packet list are examined to identify the overlay network identifier. The mirrored packets are encapsulated with the IP multicast address of the overlay network and transmitted on the overlay network. At the receiving side, the mirrored packets are decapsulated and sent to the mirroring ports that are connected to the overlay network using the overlay network identifier associated with the packet.

Some embodiments send the mirrored packets to the monitor devices using a unicast method. The mirrored packets in these embodiments are treated as special packets that are sent to all tunnel endpoints of the overlay network. The monitored ports are associated with the overlay network identifier to enable port mirroring.

When packets arrive to or transmitted from a mirrored port, the packets are duplicated (or cloned) and the overlay network identifier of the dedicated overlay network is added to the packet metadata. The packets are added to a list of mirrored packets (e.g., the packets identifiers are added to a mirrored packet list).

On a separate thread, the metadata of the packets in the mirrored packet list are examined to identify the overlay network identifier and the associated end tunnel identifiers. For each tunnel end point, a copy of the mirrored packet is generated. Each mirrored packet is encapsulated with the corresponding end tunnel identifier of the overlay network. The packets and then transmitted on the overlay network. At the receiving side, the mirrored packets are decapsulated and sent to the mirroring ports that are connected to the overlay network using the overlay network identifier associated with the packet.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

FIG. 10 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of packet mirroring that allows mirrored packets to be sent to monitor devices across multiple datacenter or across multiple networks. An overlay network dedicated to port mirroring is defined. An identifier is assigned to the overlay network. The ports to be mirrored are connected to the dedicated overlay network. In addition, one or more virtual machines (VMs) are configured as monitor (or capture) devices to receive the mirrored packets. A port of each monitor VM is also connected to the dedicated overlay network.

Figure 1:
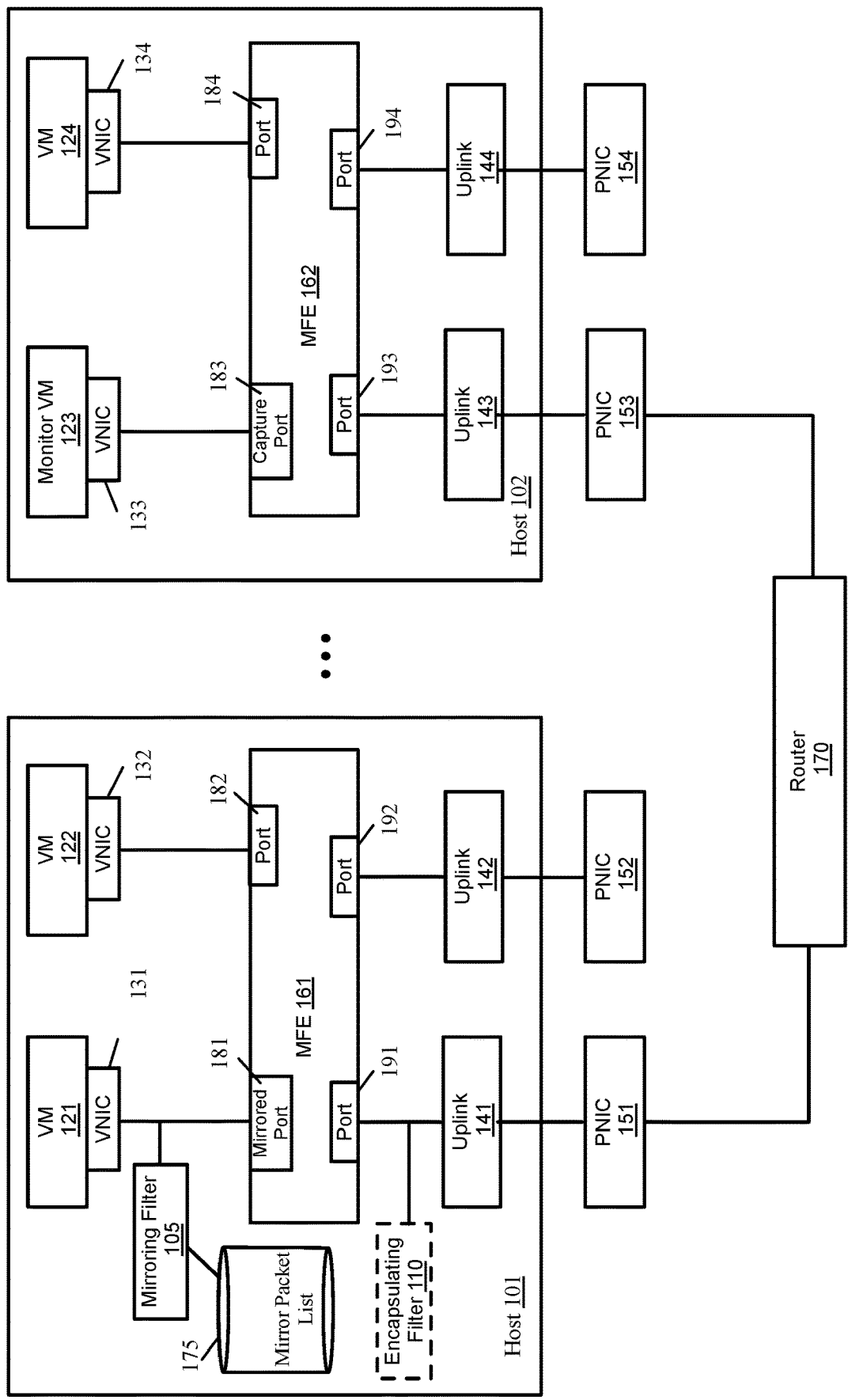
FIG. 1 conceptually illustrates a port mirroring service in some embodiments.

FIG. 1 conceptually illustrates a port mirroring service in some embodiments. The figure shows several host machines 101-102 (two are shown for convenience). The host can be physically located in different datacenters and/or different networks. Host 101 includes several virtual machine (VM) 121-122. Each host 101-102 includes a managed forwarding element (MFE) 161-162 In some embodiments, each host machine 101-102 in the network includes virtualization software (e.g., a hypervisor) for virtualizing physical resources of the host machine and a host managed forwarding element (MFE) 161-162 for forwarding network traffic (e.g., data messages) to and from the virtual machines.

In some embodiments, the host MFEs 161-162 are configured to logically forward data messages according to logical forwarding elements (e.g., logical switches, logical routers) configured by an administrator of the network to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the MVs that connect to the LFEs may reside on various different host machines within the infrastructure, and MFEs (e.g., software virtual switches) operating on these host machines implement some or all of the logical forwarding elements (logical switches, logical routers, etc.).

In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, several MFEs distributed throughout the network implement tenant's LFEs, where each MFE is a local instantiation of an LFE that operate across different host machines and can perform Open Systems Interconnection (OSI) model Layer 2 (L2)/Layer 3 (L3) packet forwarding between VMs on the host machine or on different host machines. An LFE is sometimes referred to as a virtual distributed switch (VDS).

As shown, each VM 121-122 in host 101 is connected to a corresponding virtual network interface card (VNIC) 131-132. Each VNIC 131-132 is connected to a corresponding VNIC port 181-182 of MFE 161. MFE 161 is connected to one or more physical network interface cards (PNIC) 151-152 through an uplink port 191-192.

Similarly, each VM 123-124 in host 102 is connected to a corresponding virtual network interface card (VNIC) 133-134. Each VNIC 133-134 is connected to a corresponding VNIC port 183-184 of MFE 162. MFE 162 is connected to one or more physical network interface cards (PNIC) 153-154 through an uplink port 193-194. The figure also conceptually shows that PNICs 151 and 153 are connected through router 170. In practice, there may be several more switches, routers, and gateways between the two PNICs.

In the example of FIG. 1, the VNIC port 181 (the monitor port or mirrored port) of VM 121 is being mirrored. Although the figure shows only one mirrored port, it should be understood that multiple ports in the same or other hosts can be mirrored at the same time. In this example, VM 123 in host 102 is used as a monitor VM to receive the mirrored packets through the VM's corresponding VNIC port 183 (the capture port or mirror port). Although the figure shows only one capture port, it should be understood that multiple ports in the same or other hosts can be used as capture port at the same time. The capture ports can be located in different hosts across multiple datacenters.

In the example of FIG. 1, a mirroring filter 105 is used that intercepts the packets that are received at or transmitted from the mirrored port 181. The filter duplicates the packets for mirroring and adds metadata to the filters. The filter also maintains a list 175 of the mirrored packets. Some embodiments send the mirrored packets to the monitor devices using a multicast approach. The mirrored packets in these embodiments are treated as broadcast packets or unknown unicast packets. Other embodiments send the mirrored packets to the monitor devices using a unicast method. The mirrored packets in these embodiments are treated as special packets that are sent to all tunnel endpoints of the overlay network.

As described further below, some embodiments define an overlay network that is dedicated to send the mirrored packets to the monitor VMs. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

Different embodiments utilize different methods to encapsulate packets to send them on the overlay network. In some embodiments, the mirroring filter 105 encapsulates the packets. In other embodiments, an encapsulating filter 110 is used to encapsulate mirrored packets. Yet in other embodiments, PNIC 151 or a hardware switch is configured to encapsulate the packets to transmit over the overlay network.

At the receiving side on host 102, the mirrored packets are decapsulated. The mirrored packets are sent to the capture ports 183 that are connected to the overlay network using the overlay network identifier associated with the packets.

Several more detailed embodiments of the invention are described below. Section I describes the use of multicast to send mirrored packets on an overlay network. Section II describes the use of unicast to send mirrored packets on an overlay network. Finally, Section III describes an electronic system with which some embodiments of the invention are implemented.

I. Sending Mirrored Packets on an Overlay Network Using Multicast

Figure 2:
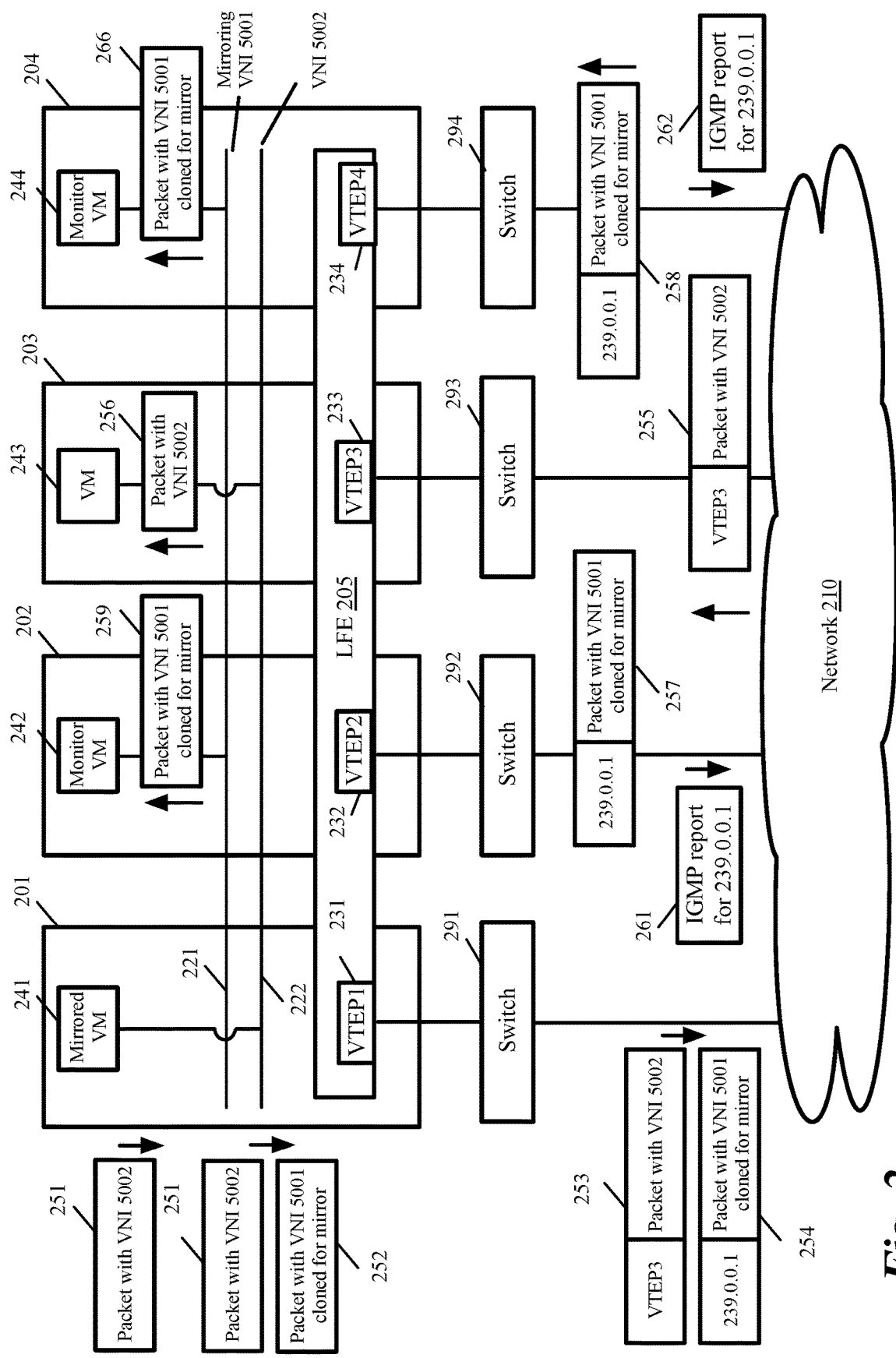
FIG. 2 conceptually illustrates mirroring packets using an overlay network and multicasting in some embodiments.

FIG. 2 conceptually illustrates mirroring packets using an overlay network and multicasting in some embodiments. The figure shows several hosts machines 201-204. The hosts may be located at different data centers. Each host 201-204 is similar to the hosts 101-102 in FIG. 1. In FIG. 2, the MFEs of the hosts 201-204 have implemented an LFE 205 as described above. Each host also hosts one or more VMs 241-244.

The figure also shows two logical networks. The first logical network 222 is an overlay network that is used to send the regular (not mirrored) tenant packet traffic between the VMs. The second logical network 221 is an overlay network is a dedicated overlay network that is used to send the mirrored packets but not the regular packet traffic.

The overlay network in the example of FIG. 2 is VXLAN. Although VXLAN is used in several examples described below, it should be understood that other types of overlay networks can also be used. As a part of the VXLAN configuration, a virtual tunnel endpoint (VTEP) 231-234 is configured on every host 201-202. The VTEPs are used to map tenants' end devices to VXLAN segments and to perform VXLAN encapsulation and decapsulation. Each VXLAN network is assigned a unique identifier referred to as virtual network identifier (VNI). Each host VTEP is assigned a unique IP address. The VTEP uses this IP address to encapsulate Ethernet frames and transmit the encapsulated packets to the transport network through the IP interface. The VTEPs are connected through switches 291-294 to the network 210. Each switches 291-294 may be a PNIC (such as 191-194 in FIG. 1) and/or other hardware switches.

In the example of FIG. 2, the mirroring overlay network 221 is assigned a VNI of 5001. Overlay network 222, which is used for regular packet traffic is assigned a VNI of 5002. As shown, packets received and transmitted by VM 241 are being mirrored. VM 242 on host 202 and VM 244 on host 204 are configured as monitor VMs to received mirrored packets.

The mirroring overlay network 221 is assigned an IP multicast address of 239.0.0.1. Each monitor VM 242 and 244 sends a request to join the IP multicast group for IP multicast address of overlay network 221. In this example, the monitor VMs use Internet group management protocol (IGMP) to join the multicast group. It should be understood that other protocols can be used to establish multicast group membership.

As shown, each monitor VM 242 and 244 sends an IGMP report 261-262 for 239.0.0.1 IP multicast address in order to join the multicast group for 239.0.0.1 multicast address. VMs 242 and 244 also turn on promiscuous mode for the capture ports (e.g., port 183 in FIG. 1) in order to receive mirrored packets with destination MAC addresses that do not match the VNIC's MAC address.

As shown, mirrored VM 241 sends a packet 251 with VNI 5002 to VM 243 (or alternatively receives a packet with from VM 243). The packet is intercepted at the VNIC port (e.g., port 181 in FIG. 1) of VM 241 by the mirroring filter (e.g., mirroring filter 105 in FIG. 1). The mirroring filter duplicates (or clones) the packet to a mirrored packet 252.

The mirroring filter also marks the mirrored packet 252 with the overlay network 221 identifier, i.e., VNI 5001. The mirroring filter also adds the mirrored packet 252 to a mirrored packet list (e.g., adds the packets identifiers to the mirrored packet list 175 in FIG. 1).

On a separate thread the mirrored packets in the mirror packet lists are examined. As described above by reference to FIG. 1, different embodiments uses the mirroring filter 106, encapsulating filter 110, PNIC 151, or a hardware switch to examine the packets in this thread. As shown, packet 251 (the packet sent to VM 243) is encapsulated (as shown by 253) with the VTEP of host 203 that hosts VM 243 (which is the destination of packet 251 as by VM 241).

The mirrored packet, on the other hand, is encapsulated (as shown by 254) with the IP multicast address of the mirroring overlay network 221. The encapsulated packets 253 and 254 are then transmitted over the network 210.

Encapsulated packet 253 is received (as shown by 255) on the overlay network 222 at host 203 where VM 243 is hosted. The packet is decapsulated and sent (as shown by 256) to VM 243 as indicated by the overlay network 222 identifier VNI 5002.

Encapsulated packet 254 that includes the mirrored packet is received (as shown by 257 and 258) by hosts 202 and 204 that host the two VMs 242 and 244 that have joined the IP multicast group for IP multicast address 239.0.0.1. The packets are decapsulated and the identifier of overlay network 221 (i.e., VNI 5001) is identified in each packet. The packets are sent (as shown by 259 and 266) to monitor VMs 242 and 244. For instance, the decapsulated packets are sent to the VNIC port 183 of each VM as shown in FIG. 1.

Figure 3:
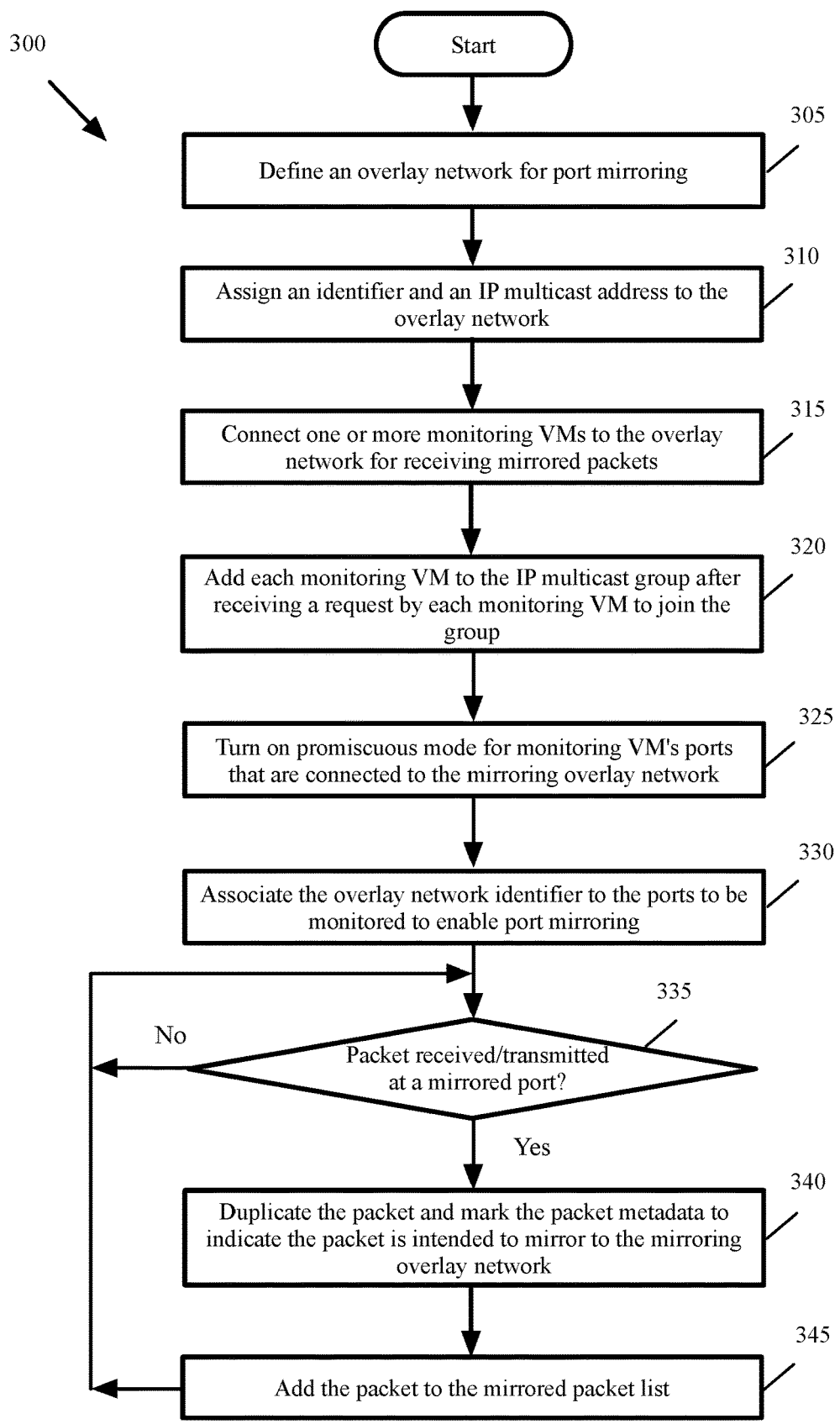
FIG. 3 conceptually illustrates a process for duplicating mirrored packets in some embodiments.

FIG. 3 conceptually illustrates a process 300 for duplicating mirrored packets in some embodiments. Process 300 in some embodiments is performed by a mirroring filter such as mirroring filter 105 in FIG. 1. In some embodiments, portions of process 300 (such as operations 305-330) may be performed by the virtualization software of each host. As shown, the process defines (at 305) an overlay network for port mirroring. For instance, the process defines overlay network 221 shown in FIG. 2.

The process then assigns (at 310) an identifier and an IP multicast address to the overlay network. For instance, the process assigns a VNI (such as VNI 5001) and IP multicast address (such as IP multicast address 239.0.0.1) to overlay network 221 as described above by reference to FIG. 2.

Next, the process defines and connects (at 315) one or more monitoring VMs to the overlay network for receiving mirrored packets. For instance, the process connects VM 123 in FIG. 1 or VMs 242 and 244 in FIG. 2 to overlay network 221. The process then receives adds (at 320) each monitoring VM to the IP multicast group after receiving a request from each monitoring VM to join the group. For instance, the process receives IGMP reports 261 and 262 for IP multicast address 239.0.0.1 from VMs 242 and 244.

The process then turns on (at 325) promiscuous mode for monitoring VM's ports that are connected to the mirroring overlay network. The promiscuous mode allows the VM (or the VNIC of the VM) to intercept and receive all packets that arrives on the overlay network. The process then associates (at 330) the overlay network identifier to the ports to be monitored in order to enable port mirroring for the mirrored ports. For instance, the process associates VNI 5001 of the mirroring overlay network 221 with the mirrored VNI port 181 of VM 121.

The process then determines (at 335) whether a packet is received or transmitted at a mirrored port. If not, the process proceeds back to 335 to wait for a packet to be received or transmitted at the mirrored port. Otherwise, when a process packet is received or transmitted at a mirrored port, the process duplicates (at 340) the packet and marks the packet metadata to indicate the packet is intended to mirror to the mirroring overlay network. For instance, the process generates the mirrored packet 252 as described above.

The process then adds (at 345) the packet to the mirrored packet list. For instance, the process adds the packets identifiers to the mirrored packet list 175 in FIG. 1. The process then proceeds to 335 to intercept the next packet for mirroring.

Figure 4:
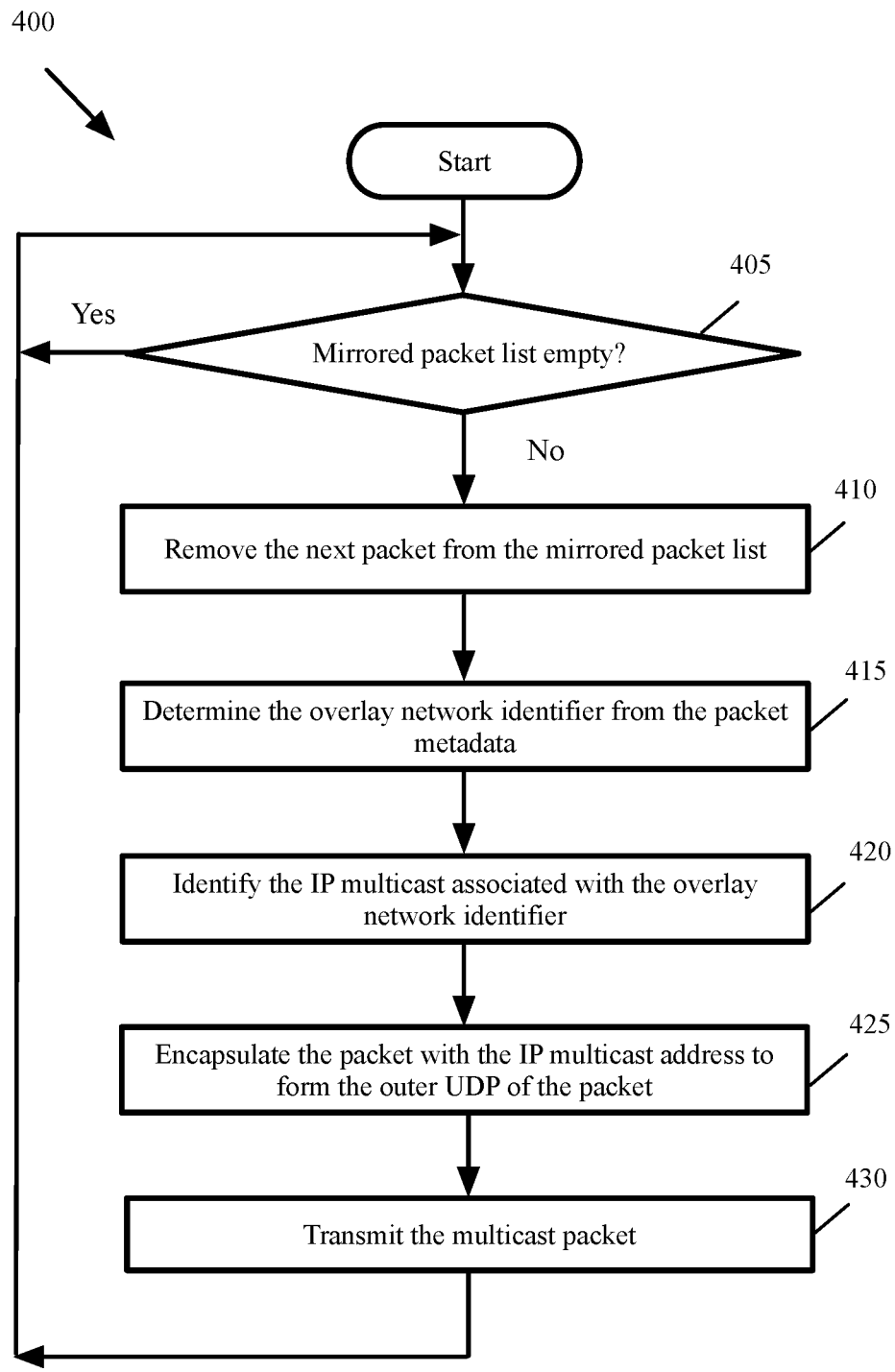
FIG. 4 conceptually illustrates a process for encapsulating mirrored packets with multicast address of an overlay networks in some embodiments.

FIG. 4 conceptually illustrates a process 400 for encapsulating mirrored packets with multicast address of an overlay networks in some embodiments. Process 400 in different embodiments is performed by different entities such as the mirroring filter 106, encapsulating filter 110, PNIC 151, or a hardware switch to examine the packets in this thread as described above.

As shown, the process determines (at 405) whether the mirrored packet list is empty. If yes, the process proceeds back to 405 to wait for a mirrored packet to be added to the list. Otherwise, the process removes (at 410) the next packet from the mirrored packet list. The process then determines (at 415) the overlay network identifier from the packet metadata. For instance, the process determines that the overlay network identifier is 5001 for mirrored packet 252.

The process then identifies (at 420) the IP multicast associated with the overlay network identifier. For instance, the process identifies the IP multicast address 239.0.0.1 as associated with VNI 5001 as described above. The process then encapsulates (at 425) the packet with the IP multicast address. For instance, the process encapsulates packet 252 with the multicast address 239.0.0.1 of overlay network 221 (as shown by 254) in FIG. 2 in order to from the outer UDP of the packet.

The process then transmits (at 430) the packet on the mirroring overlay network. The process then proceeds to 405 to process the next packet from the mirrored packet list.

Figure 5:
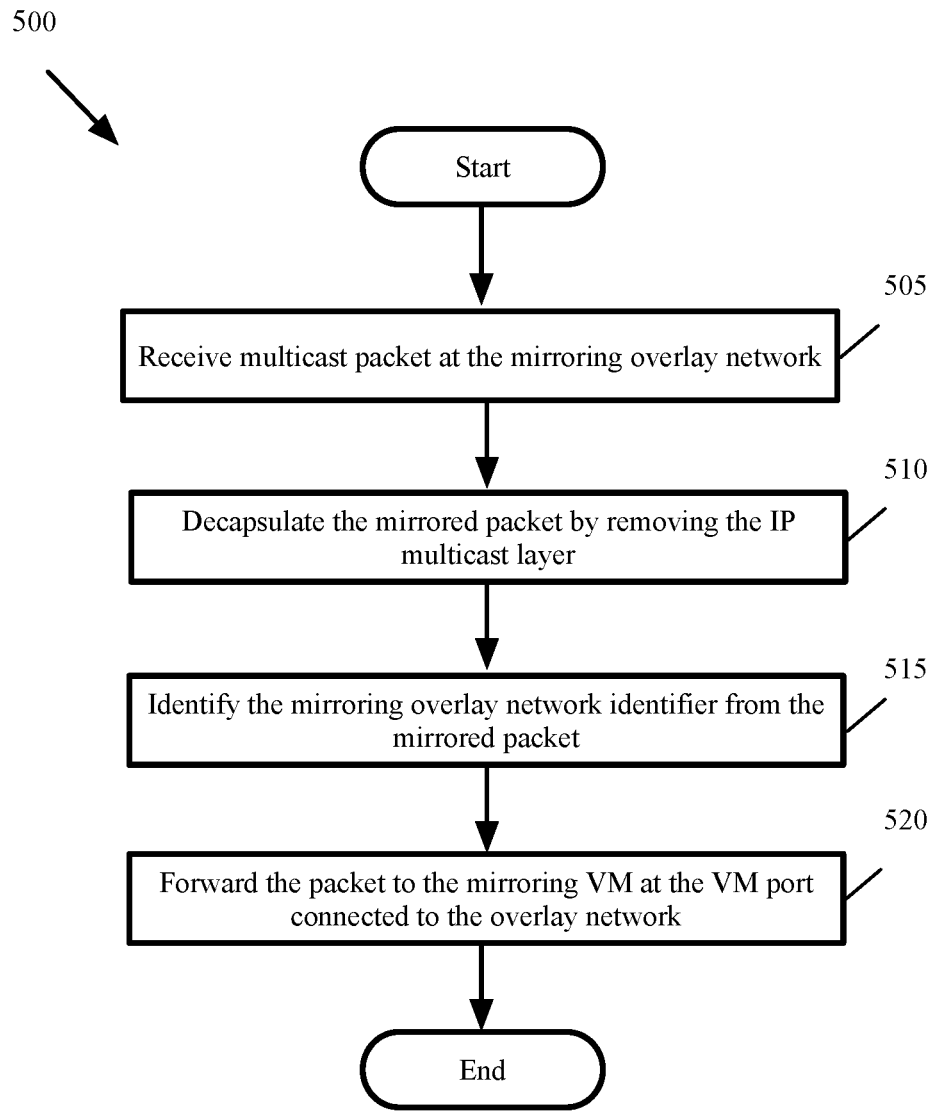
FIG. 5 conceptually illustrates a process processing of the multicast mirrored packets in some embodiments.

FIG. 5 conceptually illustrates a process 500 processing of the multicast mirrored packets in some embodiments. The process in some embodiments is performed by the host of a monitor VM. As shown, the process receives (at 505) a multicast packet at the mirroring overlay network. For instance, the process receives packet 257 or 258 at host 202 or 204 as shown in FIG. 2.

The process then decapsulates (at 520) the mirrored packet by removing the IP multicast layer. For instance, the process removes IP multicast 239.0.0.1 from packet 257 or 258. The process then identifies (at 515) the overlay network identifier from the mirrored packet metadata. For instance, the process identifies the overlay network identifier of packet 257 or 258 as 5001.

The process then forwards (at 520) the packet to the mirroring VM at the VM VNIC port that is connected to the overlay network. For instance, the process forwards packet 259 or 266 to capture VNIC port 183 as described above. The process then ends.

II. Sending Mirrored Packets on an Overlay Network Using Unicast

Figure 6:
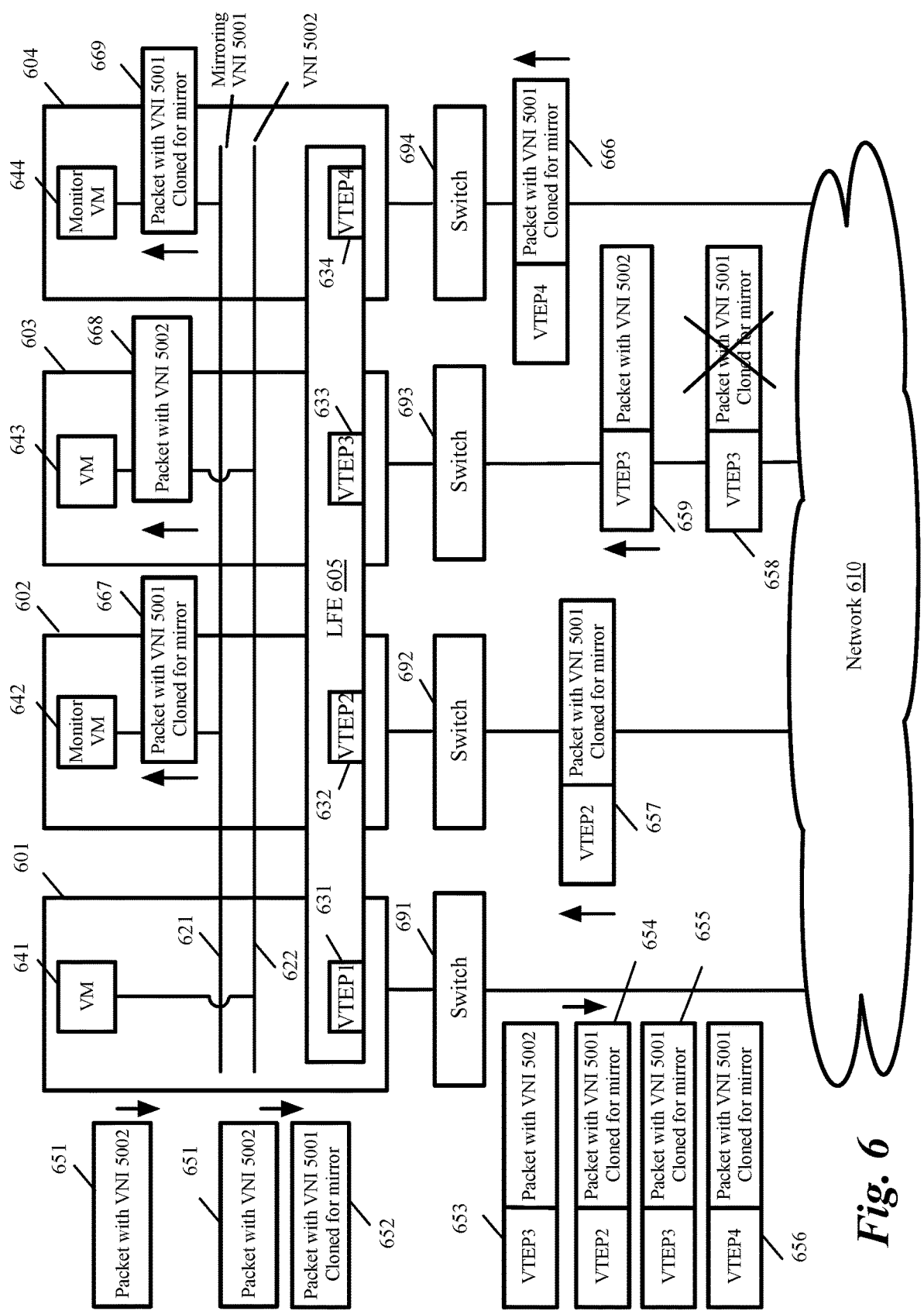
FIG. 6 conceptually illustrates mirroring packets using an overlay network and unicatsing in some embodiments.

FIG. 6 conceptually illustrates mirroring packets using an overlay network and unicatsing in some embodiments. The figure shows several hosts machines 601-604. The hosts may be located at different data centers. Each host 601-604 is similar to the hosts 101-102 in FIG. 1. In FIG. 6, the MFEs of the hosts 601-604 have implemented an LFE 605 as described above. Each host also hosts one or more VMs 641-644.

The figure also shows two logical networks. The first logical network 222 is an overlay network that is used to send the regular (not mirrored) tenant packet traffic between the VMs. The second logical network 221 is an overlay network is a dedicated overlay network that is used to send the mirrored packets but not the regular packet traffic.

The overlay network in the example of FIG. 2 is VXLAN. Although VXLAN is used in several examples described below, it should be understood that other types of overlay networks can also be used. As a part of the VXLAN configuration, a virtual tunnel endpoint (VTEP) 631-634 is configured on every host 601-602. The VTEPs are connected through switches 691-694 to the network 610. Each switches 691-694 may be a PNIC (such as 191-194 in FIG. 1) and/or other hardware switches.

In the example of FIG. 6, the mirroring overlay network 621 is assigned a VNI of 5001. Overlay network 622, which is used for regular packet traffic is assigned a VNI of 5002. As shown, packets received and transmitted by VM 641 are being mirrored. VM 642 on host 602 and VM 644 on host 604 are configured as monitor VMs to received mirrored packets.

As shown, mirrored VM 641 sends a packet 651 with VNI 5002 to VM 643 (or alternatively receives a packet with from VM 643). The packet is intercepted at the VNIC port (e.g., port 181 in FIG. 1) of VM 641 by the mirroring filter (e.g., mirroring filter 105 in FIG. 1). The mirroring filter duplicates (or clones) the packet to a mirrored packet 652.

The mirroring filter also marks the mirrored packet 652 with the overlay network 621 identifier, i.e., VNI 5001. The mirroring filter also adds the mirrored packet 652 to a mirrored packet list (e.g., adds the packets identifiers to the mirrored packet list 175 in FIG. 1).

On a separate thread the mirrored packets in the mirror packet lists are examined. As described above by reference to FIG. 1, different embodiments uses the mirroring filter 106, encapsulating filter 110, PNIC 151, or a hardware switch to examine the packets in this thread. A separate copy of the mirrored packet 652 is generated for each VTEP 632-634 (i.e., one mirrored packet per each VTEP of the mirroring overlay network that is on another host).

As shown, packet 651 (the packet sent to VM 643) is encapsulated (as shown by 653) with the VTEP of host 603 that hosts VM 643 (which is the destination of packet 651 as intended by VM 641). The mirrored packet, on the other hand, is duplicated and encapsulated (as shown by 654-656) with the VTEP of other hosts on the mirroring overlay network 221. The encapsulated packets 253-256 are then transmitted over the network 610.

Encapsulated packet 253 is received (as shown by 259) on the overlay network 622 at host 603 where VM 643 is hosted. The packet is decapsulated and sent (as shown by 668) to VM 643 as indicated by the overlay network 622 identifier VNI 5002.

Encapsulated packet 656 that includes the mirrored packet is received (as shown by 658) on the mirroring overlay network 621 at host 603. The packet is dropped since the packet includes the VNI 5001 of the mirroring overlay network there are no VMs (in this example) that is connected to mirroring overlay network on host 603.

Packets 657 and 666 that includes the mirrored packet are received (as shown by 657 and 666) by hosts 602 and 604 that host the two VMs 642 and 644 that are connected to the overlay network 621. The packets are decapsulated and the identifier of overlay network 621 (i.e., VNI 5001) is identified in each packet. The packets are sent (as shown by 667 and 668) to monitor VMs 642 and 644. For instance, the decapsulated packets are sent to the VNIC port 183 of each VM as shown in FIG. 1.

Figure 7:
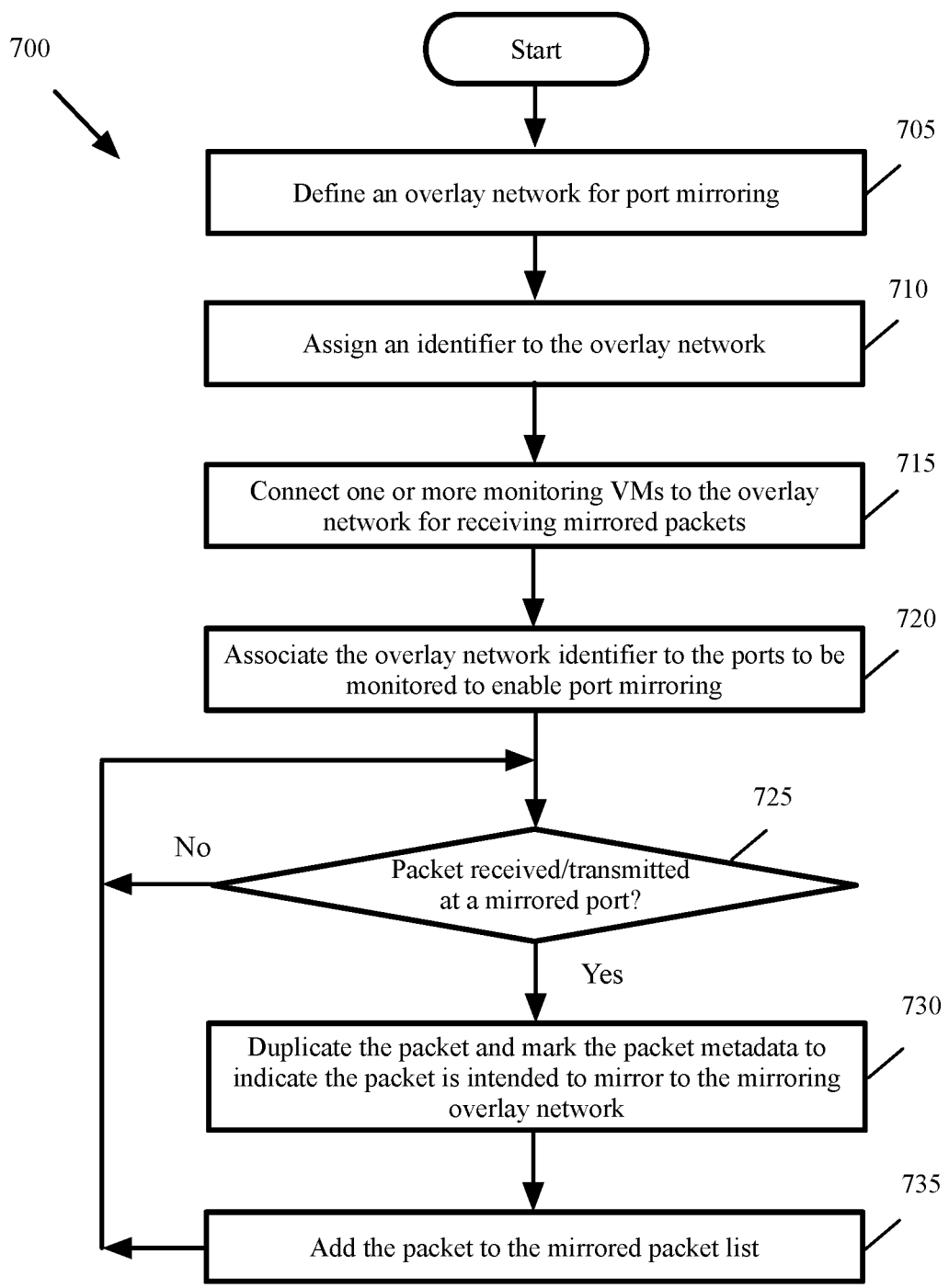
FIG. 7 conceptually illustrates a process for duplicating mirrored packets in some embodiments.

FIG. 7 conceptually illustrates a process 700 for duplicating mirrored packets in some embodiments. Process 700 in some embodiments is performed by a mirroring filter such as mirroring filter 105 in FIG. 1. In some embodiments, portions of process 700 (such as operations 705-720) may be performed by the virtualization software of each host. As shown, the process defines (at 705) an overlay network for port mirroring. For instance, the process defines overlay network 621 shown in FIG. 6.

The process then assigns (at 710) an identifier to the overlay network. For instance, the process assigns a VNI (such as VNI 5001) to overlay network 621 as described above by reference to FIG. 6.

Next, the process defines and connects (at 715) one or more monitoring VMs to the overlay network for receiving mirrored packets. For instance, the process connects VM 123 in FIG. 1 or VMs 642 and 644 in FIG. 6 to overlay network 621. The process then associates (at 720) the overlay network identifier to the ports to be monitored in order to enable port mirroring for the mirrored ports. For instance, the process associates VNI 5001 of the mirroring overlay network 621 with the mirrored VNI port 181 of VM 121.

The process then determines (at 725) whether a packet is received or transmitted at a mirrored port. If not, the process proceeds back to 725 to wait for a packet to be received or transmitted at the mirrored port. Otherwise, when a the process packet is received or transmitted at a mirrored port, the process duplicates (at 730) the packet and marks the packet metadata to indicate the packet is intended to mirror to the mirroring overlay network. For instance, the process generates the mirrored packet 652 as described above.

The process then adds (at 735) the packet to the mirrored packet list. For instance, the process adds the packets identifiers to the mirrored packet list 175 in FIG. 1. The process then proceeds to 725 to intercept the next packet for mirroring.

Figure 8:
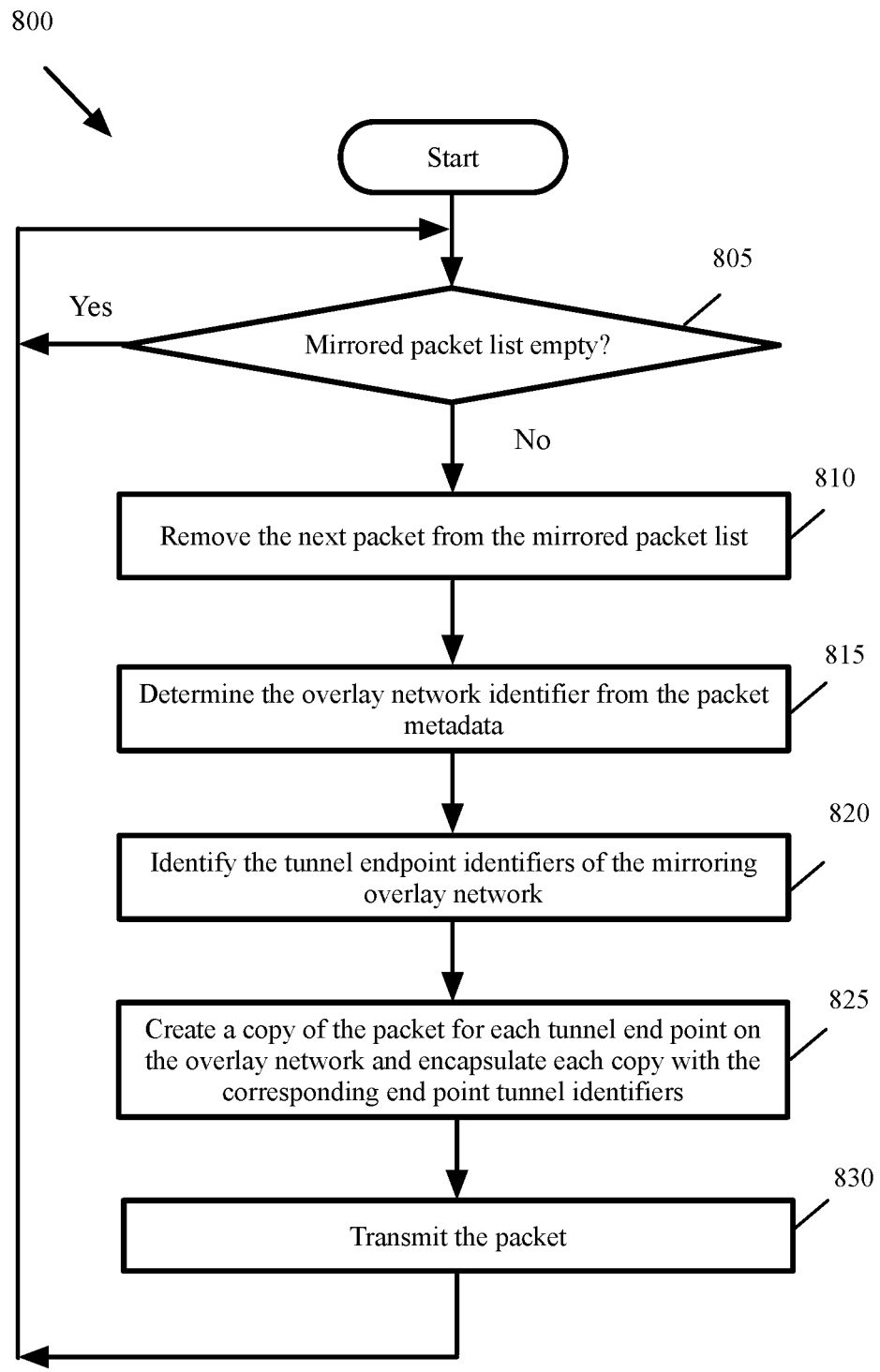
FIG. 8 conceptually illustrates a process for encapsulating mirrored packets with tunnel end point address of an overlay networks in some embodiments.

FIG. 8 conceptually illustrates a process 800 for encapsulating mirrored packets with tunnel end point of an overlay networks in some embodiments. Process 800 in different embodiments is performed by different entities such as the mirroring filter 106, encapsulating filter 110, PNIC 151, or a hardware switch to examine the packets in this thread as described above.

As shown, the process determines (at 805) whether the mirrored packet list is empty. If yes, the process proceeds back to 805 to wait for a mirrored packet to be added to the list. Otherwise, the process removes (at 810) the next packet from the mirrored packet list. The process then determines (at 815) the overlay network identifier from the packet metadata. For instance, the process determines that the overlay network identifier is 5001 for mirrored packet 652.

The process then identifies (at 820) the tunnel endpoint identifiers of the overlay network. For instance, the process identifies VTEPs 632-634 as the VTEPs of the mirroring overlay network on other host. The process then creates (at 825) a copy of the packet for each tunnel end point on the overlay network and encapsulate each copy with the corresponding end point tunnel identifiers. For instance, the process makes copies of the mirrored packet and encapsulates the packets with the VTEPs of the mirroring overlay network as shown by 654-656 in FIG. 3.

The process then transmits (at 830) the packets on the mirroring overlay network. The process then proceeds to 805 to process the next packet from the mirrored packet list.

Figure 9:
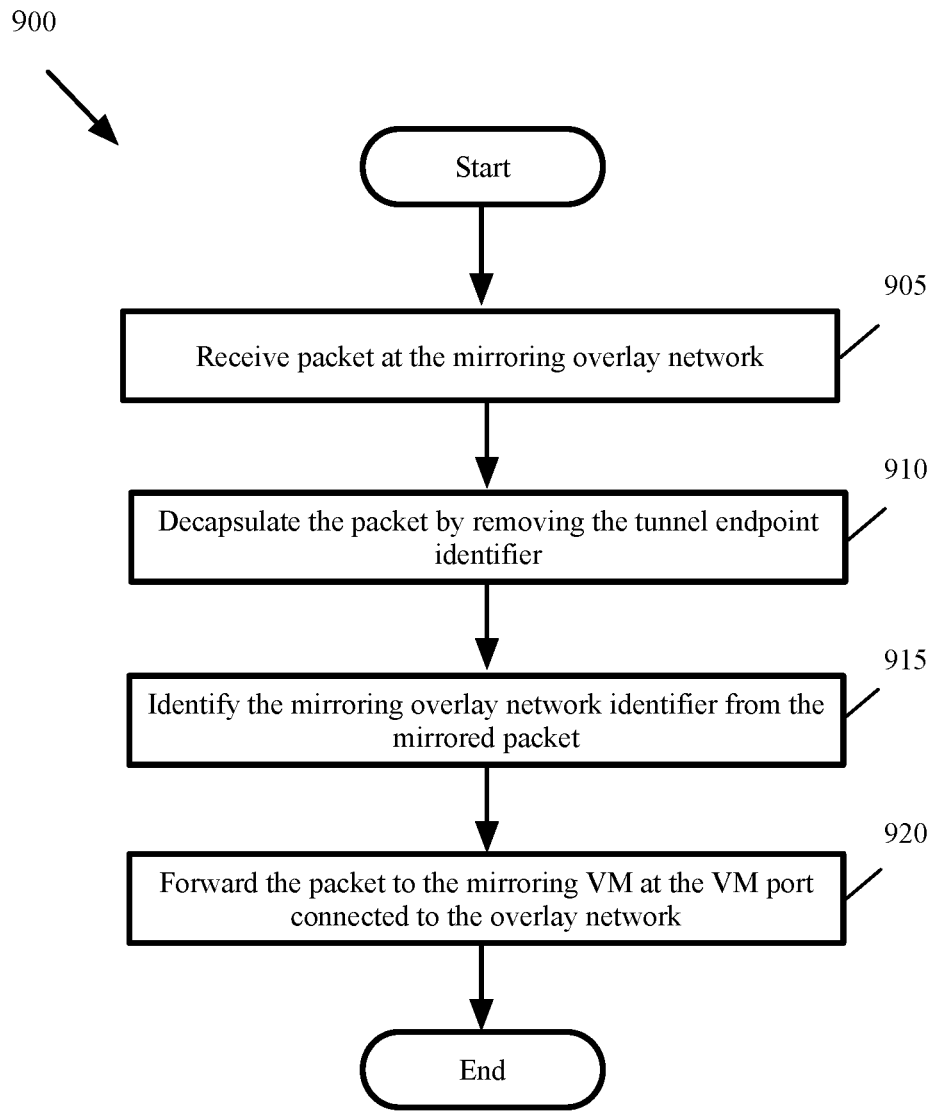
FIG. 9 conceptually illustrates a process for processing of the unicast mirrored packets in some embodiments.

FIG. 9 conceptually illustrates a process 900 for processing of the unicast mirrored packets in some embodiments. The process in some embodiments is performed by the host of a monitor VM. As shown, the process receives (at 905) a packet at the mirroring overlay network. For instance, the process receives packet 657 or 666 at host 602 or 604 as shown in FIG. 2.

The process then decapsulates (at 920) the mirrored packet by removing the VTEP of the mirroring overlay network. For instance, the process removes VTEP from packets 657 and 666 as shown by 667 and 668 in FIG. 6. The process then identifies (at 915) the mirroring overlay network identifier from the mirrored packet metadata. For instance, the process identifies the overlay network identifier of packet 657 or 666 as 5001.

The process then forwards (at 920) the packet to the mirroring VM at the VM VNIC port that is connected to the overlay network. For instance, the process forwards packet 667 or 668 to capture VNIC port 183 as described above. The process then ends.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1020, a read-only memory (ROM) 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 3-5, and 7-9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of mirroring packets in a network, the method comprising:
at a module executing on a host computer separately from a first data compute node (DCN) also executing on the host computer:
identifying a first packet sent by the first DCN and addressed to a second DCN, the first and second DCNs connected to a first overlay network having a first overlay network identifier;
generating a mirrored second packet by making a copy of the identified first packet and marking the second packet for transmission via a second overlay network having a second overlay network identifier, the second overlay network dedicated for mirrored packets;
based on the marking of the second packet, encapsulating the mirrored second packet with an encapsulating header storing the second overlay network identifier and an IP (Internet Protocol) multicast address associated with a set of monitoring DCNs connected to the second overlay network that (i) have requested to receive mirrored packets on the second overlay network by sending messages to join a multicast group associated with the IP multicast address and (ii) perform monitoring operations on received mirrored packets;
providing the encapsulated second packet for transmission via the second overlay network to forward the encapsulated second packet to the set of monitoring DCNs based on the IP multicast address and the second overlay network identifier; and
providing an encapsulated first packet for transmission via the first overlay network to the second DCN, the encapsulated first packet comprising an encapsulating header storing the first overlay network identifier, which is used to forward the first packet through the first overlay network.

2. The method of claim 1, wherein:
the network comprises a set of forwarding elements that implement the first and second overlay networks; and
the set of monitoring DCN sends the messages to join the multicast group to at least one of the forwarding elements.

3. The method of claim 1 further comprising identifying the IP multicast address by using the second overlay network identifier.

4. The method of claim 1, wherein a first monitoring DCN executes on another host computer and receives the mirrored second packet decapsulated with the second overlay network identifier.

5. The method of claim 4, wherein the first DCN and at least one of the monitoring DCNs execute on two host computers in two different datacenters.

6. The method of claim 1, wherein at least one of the first and second DCNs is a virtual machine (VM).

7. The method of claim 1, wherein the first and second overlay networks each use one of Virtual eXtensible LAN (VXLAN), Generic Network Virtualization Encapsulation (GENEVE), and Network Virtualization using Generic Routing Encapsulation (NVGRE) encapsulation.

8. The method of claim 1, wherein:
the host computer further executes a managed forwarding element (MFE) comprising a port; and
identifying the first packet comprises receiving the packet at the MFE port from the first DCN.

9. The method of claim 8, wherein the module is a filter associated with the MFE port.

10. The method of claim 8, wherein the MFE implements a logical forwarding element (LFE) with a plurality of other MFEs executing on a plurality of other host computers, including a set of host computers on which the set of monitoring DCNs execute.

11. The method of claim 10, wherein:
the network is an underlay network over which the first and second overlay networks are defined; and
the set of monitoring DCNs send, to at least one forwarding element in the in the set of forwarding elements, requests to receive packets with destination addresses that include the IP multicast address.

12. The method of claim 1, wherein
the encapsulating header specifies the IP multicast address as the destination address of the mirrored second packet.

13. A non-transitory machine readable medium storing a program for execution by a set of processing units of a host computer, a particular data compute node (DCN) also executing on the set of processing units of the host computer, the program for mirroring packets in a network, the program comprising sets of instructions for:
identifying a first packet sent by the first DCN and addressed to a second DCN, the first and second DCNs connected to a first overlay network having a first overlay network identifier;
generating a mirrored second packet by making a copy of the identified first packet and marking the second packet for transmission via a second overlay network having a second overlay network identifier, the second overlay network dedicated for mirrored packets;
based on the marking of the second packet, encapsulating the mirrored second packet with an encapsulating header storing the second overlay network identifier and an IP (Internet Protocol) multicast address associated with a set of monitoring DCNs connected to the second overlay network that (i) have requested to receive mirrored packets on the second overlay network by sending messages to join a multicast group associated with the IP multicast address and (ii) perform monitoring operations on received mirrored packets;
providing the encapsulated second packet for transmission via the second overlay network, to forward the encapsulated second packet to the set of monitoring DCNs based on the IP multicast address and the second overlay network identifier; and providing an encapsulated first packet for transmission via the first overlay network to the second DCN, the encapsulated first packet comprising an encapsulating header storing the first overlay network identifier, which is used to forward the first packet through the first overlay network.

14. The non-transitory machine readable medium of claim 13 wherein the program further comprises sets of instructions for identifying the IP multicast address by using the second overlay network identifier.

15. The non-transitory machine readable medium of claim 13, wherein a first monitoring DCN executes on another host computer and receives the mirrored second packet decapsulated with the second overlay network identifier.

16. The non-transitory machine readable medium of claim 13, wherein the first DCN and at least one of the monitoring DCNs execute on two different host computers located in two different datacenters.

17. The non-transitory machine readable medium of claim 13, wherein at least one of the first and second DCNs is a virtual machine (VM).

18. The non-transitory machine readable medium of claim 13, wherein the first and second overlay networks each use one of Virtual eXtensible LAN (VXLAN), Generic Network Virtualization Encapsulation (GENEVE), and Network Virtualization using Generic Routing Encapsulation (NVGRE) encapsulation.

* * * * *